(12) United States Patent
Chang et al.

(10) Patent No.: US 9,734,141 B2
(45) Date of Patent: Aug. 15, 2017

(54) WORD MAPPING

(71) Applicants: Yang Chang, Lexington, MA (US);
Monica Chang, Lexington, MA (US)

(72) Inventors: Yang Chang, Lexington, MA (US);
Monica Chang, Lexington, MA (US)

( * ) Notice: Subject to any disclaimer, the term of this patent is extended or adjusted under 35 U.S.C. 154(b) by 203 days.

(21) Appl. No.: 14/860,893

(22) Filed: Sep. 22, 2015

(65) Prior Publication Data
US 2017/0083492 A1    Mar. 23, 2017

(51) Int. Cl.
| | |
|---|---|
| *H03M 5/00* | (2006.01) |
| *H03M 7/00* | (2006.01) |
| *G06F 17/27* | (2006.01) |
| *G06F 17/30* | (2006.01) |
| *G09B 29/00* | (2006.01) |
| *G10L 15/18* | (2013.01) |
| *G06F 17/28* | (2006.01) |
| *G10L 15/183* | (2013.01) |
| *G10L 15/26* | (2006.01) |

(52) U.S. Cl.
CPC ...... *G06F 17/2705* (2013.01); *G06F 17/2785* (2013.01); *G06F 17/30684* (2013.01); *G09B 29/00* (2013.01); *G10L 15/1822* (2013.01); *G06F 17/2765* (2013.01); *G06F 17/2795* (2013.01); *G06F 17/28* (2013.01); *G10L 15/183* (2013.01); *G10L 15/26* (2013.01)

(58) Field of Classification Search
CPC ............. G06F 17/2705; G06F 17/2765; G06F 17/2785; G06F 17/2795; G06F 17/28; G06F 17/30684; G09B 29/00; G10L 15/1822; G10L 15/183; H03M 5/00; H03M 7/00; H04M 1/271; H04M 3/4936

USPC ......................................................... 715/271
See application file for complete search history.

(56) References Cited

U.S. PATENT DOCUMENTS

| | | | |
|---|---|---|---|
| 4,384,329 A | 5/1983 | Rosenbaum et al. | |
| 4,839,853 A | 6/1989 | Deerwester et al. | |
| 5,594,837 A | 1/1997 | Noyes | |
| 6,523,001 B1 | 2/2003 | Chase | |
| 7,165,023 B2 | 1/2007 | Corman et al. | |

(Continued)

FOREIGN PATENT DOCUMENTS

| | | |
|---|---|---|
| CN | 102446190 | 5/2012 |
| CN | 103078913 | 5/2013 |

(Continued)

OTHER PUBLICATIONS

Ricard V. Sol_e, Bernat Corominas Murtra, Sergi Valverde, and Luc Steels. (2005). Language Networks: their structure, function and evolution. SFI Working Paper: 2005-12-042. Santa Fe Institute.

(Continued)

*Primary Examiner* — Cesar Paula
*Assistant Examiner* — Luu-Phuong Nguyen
(74) *Attorney, Agent, or Firm* — Lambert & Associates; Gary E. Lambert; David J. Connaughton, Jr.

(57) ABSTRACT

A word mapping method is provided, based on a plurality of connections between a plurality of words as generated by an individual or group, the map being formed based on connections between words provided by an individual or individuals. The resultant word map may be used for various purposes including cognitive diagnoses, sentence structure optimization of documents, and the like.

20 Claims, 9 Drawing Sheets

(56) References Cited

U.S. PATENT DOCUMENTS

| | | | |
|---|---|---|---|
| 7,707,201 | B2 | 4/2010 | Kapur et al. |
| 8,190,422 | B2 | 5/2012 | Ascoli et al. |
| 8,280,720 | B2 | 10/2012 | Tsuzuki et al. |
| 8,386,482 | B2 | 2/2013 | Gopalakrishnan |
| 8,660,973 | B1 | 2/2014 | Feigenbaum |
| 8,700,652 | B2 | 4/2014 | Agarwal |
| 8,744,840 | B1* | 6/2014 | Morrison ............ G06F 17/2827 704/1 |
| 2005/0171760 | A1* | 8/2005 | Tinkler ............... G06F 17/2795 704/10 |
| 2008/0103721 | A1 | 5/2008 | Tsai et al. |
| 2009/0228442 | A1* | 9/2009 | Adams .............. G06F 17/30864 |
| 2013/0108996 | A1* | 5/2013 | Snell ...................... G09B 19/00 434/236 |
| 2014/0195536 | A1* | 7/2014 | Diament ........... G06F 17/30705 707/737 |
| 2015/0052098 | A1* | 2/2015 | Kveton ............. G06F 17/30731 706/52 |
| 2016/0314701 | A1* | 10/2016 | Kim ....................... G09B 19/04 |

FOREIGN PATENT DOCUMENTS

| | | |
|---|---|---|
| CN | 103744954 | 4/2014 |
| WO | 03102812 | 12/2003 |
| WO | 2015009682 | 1/2015 |

OTHER PUBLICATIONS

Mark Steyvers and Joshua B. Tenenbaum (2005). The Large-Scale Structure of Semantic Networks: Statistical Analyses and a Model of Semantic Growth. Cognitive Science 29 (2005) 41-78.

Adilson E. Motter, Alessandro P. S. de Moura, Ying-Cheng Lai, and Partha Dasgupta (2002). Topology of the conceptual network of language. Physical Review E, vol. 65, 065102(R).

How does the IQ test work? (2012). Retrieved Oct. 13, 2014, from https://www.learnmyself.com/IQ-Test.

* cited by examiner

Figure 1: An Example of a Knowledge Network (undirected)

Figure 2: A Simple Example of iWordNet

Figure 3: The ellipse represents a phrase and the square represents a performed action.

Figure 4: A Real iWordNet Consisting of over 2000 Words (Vertices)

Figure 5: IQ modeling based on 20 iWordnets

WORD MAPPING

BACKGROUND

Field of the Invention

This invention relates cognitive science, psychology, and artificial intelligence. More particularly, it relates the tools and technology used to improve learning ability, diagnoses of changes in cognitive impairment, and education systems.

Description of Related Art

Traditionally, neuroscience as a biological study of the brain and mind, and cognitive science as a psychological approach to studying the mind and how we acquire knowledge. While these methods have, in the past, provided ways to study the brain and mind, they are often invasive, expensive, cumbersome, and/or limited in application. The present invention, however, provides a new way, using network technology to study the brain/mind and cognitive science.

Network Science has been emerging because our lives are intimately tied to different types of networks, whether it is social networks, transportation networks, or neural networks. To use Network Science methodology to study the mind and cognitive development, knowledge needs to be expressed as a network of concepts.

Therefore, what is needed is a non-invasive, low-cost, and environmentally friendly tool for studying cognitive science and psychology that uses network science as its basis. A study of cognitive science using the word mapping of the present invention can be done quickly, with almost no environmental constraints, and can be done anywhere, in any Language, in any combination of languages, with no limitations on age or language ability. The changes in the outcomes can be easily monitored over time, and the difference can be compared across individuals.

SUMMARY

The subject matter of this application may involve, in some cases, interrelated products, alternative solutions to a particular problem, and/or a plurality of different uses of a single system or article.

In one aspect, a method for forming a word map based on a subject's or subjects' understanding of words and their relationships is provided. The method begins by identifying a subject(s) to generate the word map for, and providing the subject with a plurality of base words to begin the mapping. The subject is instructed to list off words that the subject considers related to the base words. These provided words are recorded as a second plurality of words. Words relating to the second plurality of words may also be recorded as a third plurality of words. The process of providing and receiving words to and from the subject continues until the word map is completed. During formation of the word map, links (shown as lines) between two words that the subject considers related are generated as well. These links may join the second plurality of words with the corresponding base word, and may also join second and third plurality of words to each other, base words to each other, base words to third plurality of words, and so on. Often, these links may form circular relationships, eventually joining back to words from which they link back to through other words.

DETAILED DESCRIPTION

Figure 1:
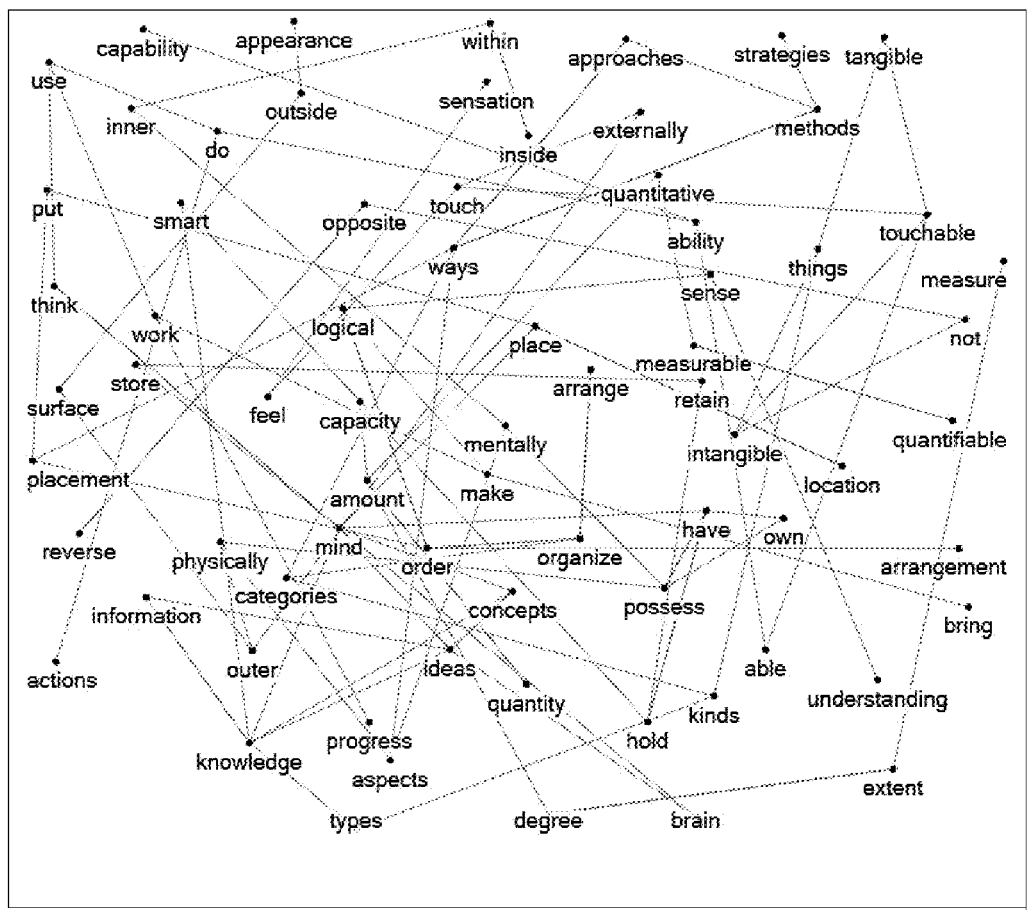
FIG. 1 provides a view of an embodiment of a word map.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components and materials have not been described in detail as not to unnecessarily lengthen the present disclosure.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user input and/or output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in non-transitory computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The word mapping of the present invention is referred to herein as iConceptMapping. iConceptMapping is a methodology for studying cognitive science through the networks of concepts. The methodology consists of three main parts: (1) constructing individual networks of concepts, called iBrainMap, (2) Numerization of a person's understanding of word strings (phrases, sentences, articles), and (3) modeling cognitive ability using the networks.

We can explain a concept by another concept, which are further explained by other concepts, and so on. If we connect a concept with the concepts directly used in the explanation, a network of concepts is constructed (FIG. 1). The network reflects the state of mind of a person, so it can be used to study an individual's knowledge, learning ability, etc., and can be used in clinics for patients' cognitive evaluation and in education systems for effective learning.

TERMS AND DEFINITIONS

Figure 2:
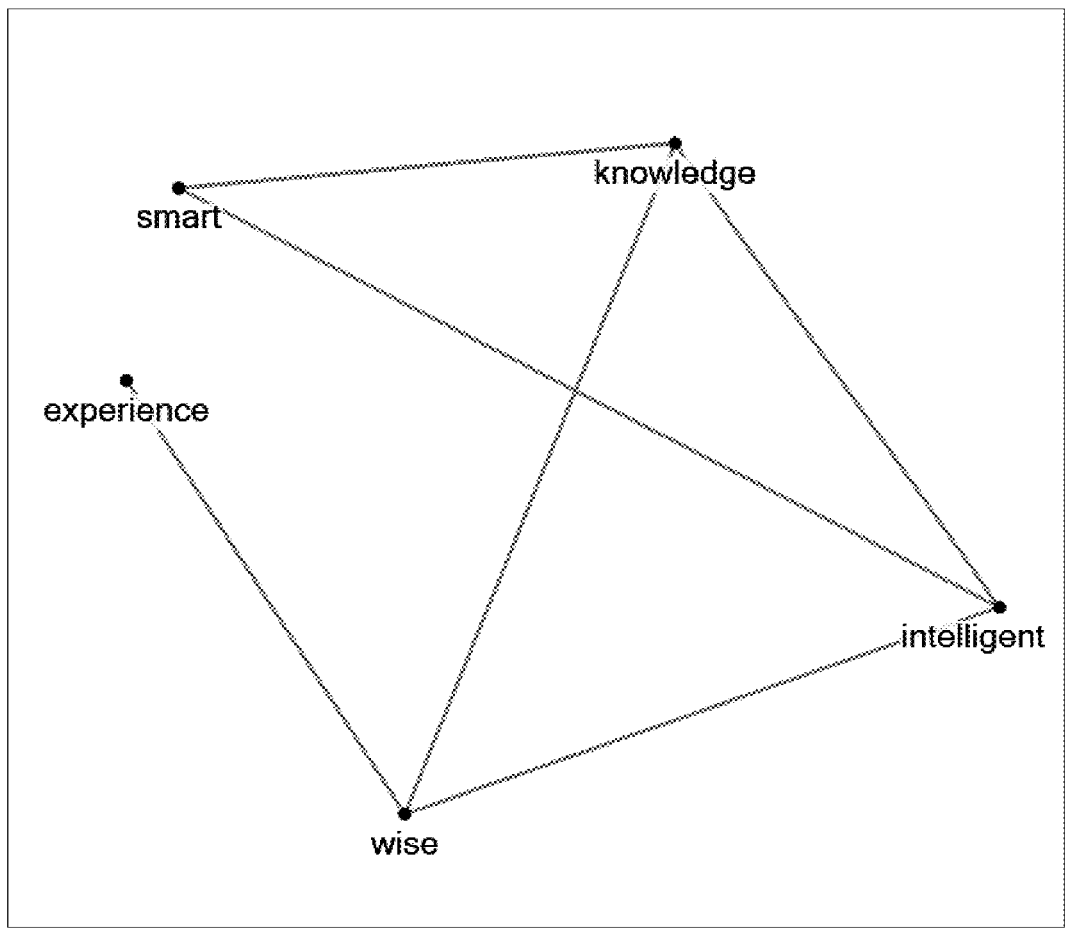
FIG. 2 provides a view of another embodiment of a word map.

In a dictionary, words are defined by other words, which are further defined by other words, and so on. If we connect these words using lines to reflect their direct relationships, we will have a network of words, called a Wordnet (see FIGS. 1 and 2). Similarly, a person's brain, like a dictionary, has a unique understanding of the words. One explains the meaning of a word using other words, which can be further explained by other words. This process can go on for a long time. Based on one's explanations, we can formulate a network of words as we did with the English dictionary, but specific to the person. We call such a Wordnet an iWordNet (See FIG. 2). An iWordNet reflects an individual's knowledge, intelligence, ability to learn, and personality, etc. Therefore it can be used to study one's cognitive development or cognitive science, psychology, and education.

Figure 3:
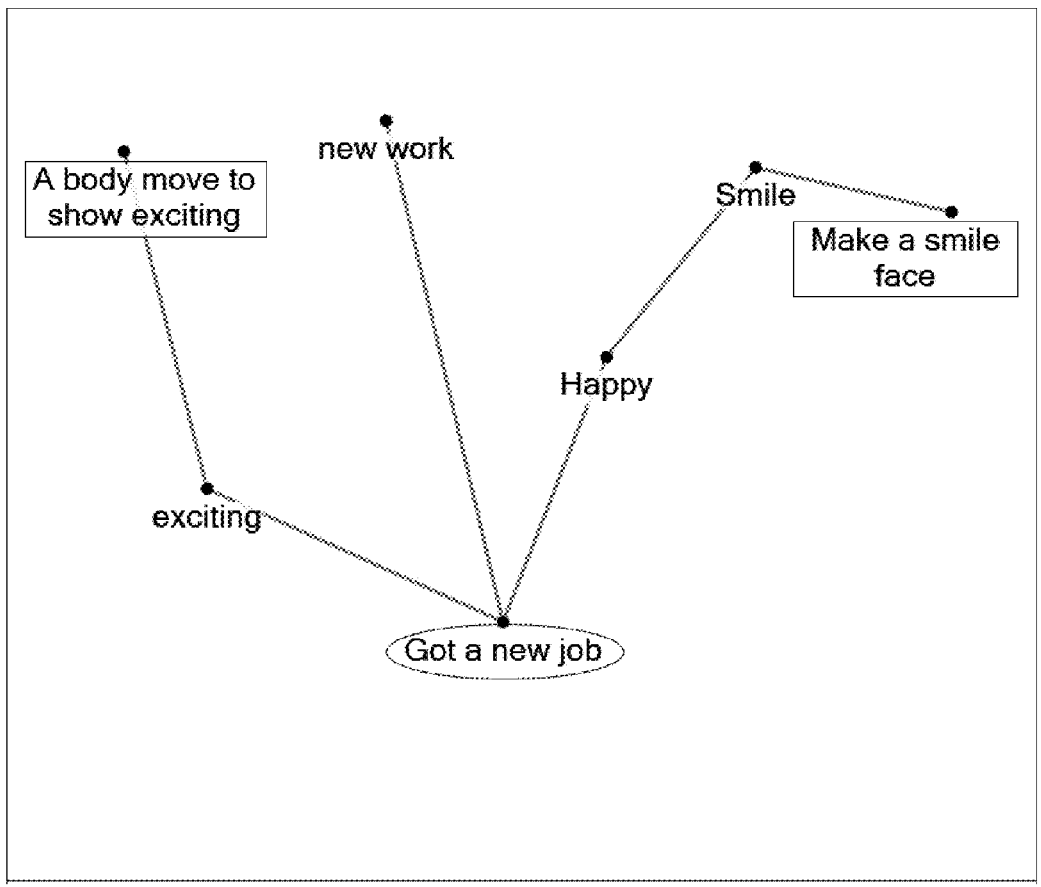
FIG. 3 provides a view of yet another embodiment of a word map.

We can expand this iWordNet idea to iConceptNet, which is similar to iWordNet, but the items in the vertices of the network are not limited to words; it can include phrases, long text strings, sentences, symbols, pictures representing activities or events, or even music clips, video clips, and other relevant items, allowing for the inclusion of multiple languages (See FIG. 3). In an iConceptNet, the items that are directly connected can be in the relationship of one explaining the other or some other relationship, for example, one causes thinking of item other, such as "hungry" makes one think of "food."

iConceptNet can be expanded further into iKnowledgeNet, which is an aggregation or integration of multiple iConceptNets into a bigger network of concepts. iWordNet, iConceptNet, and iKnowledgeNet are generally called iBrainMap herein and are all types of word maps.

iWordNet and iConceptNet are individualized (vary from person to person or group to group), dynamic (change over time), and informative (it's structures inform the person's knowledge, leaning ability, etc.) networks. iKnowledgeNet is an integration of iConceptNets.

When the concepts of iBrainMaps (iWordNet, iConceptNet, and iKnowledgeNet) are used for a group of people instead of an individual, we generate gBrainMaps (gWordNet, gConceptnet, and gKnowledgenet), which reflect the collective intelligence of the group. Thus, gKnowledgenet is not an integration of iKnowledgeNets, but an integration of gConceptnets. Such a group can be a couple, family, a department, a company, a university, an ethnic group or social group, etc. Therefore, gBrainMap can be used to study any organization or group of people.

Both iBrainMaps and gBrainMaps can be directed or undirected networks. When the edges in the networks are directionless, the networks are undirected; when directed lines are used in the network and directions are an indication of directed relationships between pairs of nodes, then the networks are directed. For example, we can use an arrow to represent the relationship between a word to be defined and a word in its definition.

Both iBrainMaps and gBrainMaps are usually cyclic, meaning there are circular definitions or relationships within them. For instance, looking on the online Webster dictionary, we found that confusion means perplexity, perplexity means bewilderment, bewilderment means incomprehension, and incomprehension means confusion, which turns out to be a cyclic network with many loops or circular definitions. Similarly, an iWordNet, a gWordNet of a human brain, is also a cyclic network with many loops of circular definitions as long as the network is large enough.

As a general term, all of the above mappings are collectively and generally referred to as word maps, and this term may be used herein to refer to any and/or all of the above specific versions.

The present invention is a modeling technology platform to study cognitive science. The system consisting of three main parts: (1) iBrainMaps and gBrainMaps, (2) numerization of iBrainMaps and gBrainMaps, and (3) modeling cognitive measurements using features of these maps. The iBrainMap includes the iWordNet, iConceptNet, and iKnowledgeNet. The gBrainMaps include the gWordnet, gConceptnet, and gKnowledgenet. The numerization includes the methods to numerically characterize personalized understanding of a word string (a word, a phrase, a paragraph, an article, etc.) The modeling part includes the characterization of the networks and the analysis and modeling of the networks using local and global topological properties of the networks, and applications of the maps for numerous analytic purposes.

The present invention further provides a modeling technology platform for extracting information from a brain (or brains) using iBrainMaps and gBrainMaps, and for modeling for a person's cognitive quantities in clinics, experiments, or education using network topological properties.

Local topological properties (e.g., connections and properties around a certain word or vertex) can be used in clinics or experimental settings to study people's cognitive aspects using the local properties of the networks. Local topological properties such as connections around a certain word or vertex are related to the specific meaning of a word or concept. Local properties in the network might explain why a certain individual is impaired in a certain aspect, e.g., for local cognitive impairment in a particular word or concept.

Unlike the traditional study of cognition, for which the meanings of words are essential. In one embodiment, the present invention is a technology to identify relationships between the global topological properties and an individual's personalities, behaviors, cognitive statuses and changes. These global topological properties such as centrality, closeness, number of edges, number of vertices, which are irrelevant to the meaning of the words used in the network, can be used to study the overall knowledge, cognitive attributes, or personalities of an individual. In other words, we don't have to know the meaning of the Chinese words in a Chinese WordNet for example, to be able to study the cognitive characteristics implicated by the iWordNet Instead, in studying the overall cognitive development of individuals. In this embodiment, we can focus on the geometric properties of the network, without knowing the meanings of the words in the network. This idea may be difficult to accept at first glance, but it is true because (1) the meaning of a word depends on where and how it is used—basically the location at which the word appears, and (2) the recursive explanation of a word by another word and circular definitions make a word nothing but a placeholder.

A concept is defined by other concepts and terms, which are further defined by other concepts and terms. Therefore, we will end up with a situation that all concepts have circular definition or some words cannot be defined by other concepts. The meaning of each word is different for different individuals and changes over time. Most of the time people think they understand each other when they establish a mapping (or agreement) between what they perceive. It is basically the situation: "I know what you are talking about" or "I understand what you mean." However, one's perceived understanding and another's actual understanding can be different. But it does not matter as long as one thinks they understand what another understands, and vice versa. That is, the meaning of a word has to be defined in terms of individuals; the definitions words cannot be isolated by individual words separately. The meanings of words are nothing but mappings in the iWordNet and are almost completely defined by the topology of the iWordNet.

We will use a real life experiment to explain and illustrate the steps using iConceptMapping and the experimental outcomes show that there is statistically significant relationship between IQ and topological properties of individual networks.

An iBrainMap or gBrainMap as contemplated herein can be in a graphical network form, a table-like form, a database-like form, or a mixture of them. An iBrainMap as a network connects concepts and constitutes a body of an individual's knowledge, whereas a gBrainMap reflects the collective intelligence (including emotional intelligence) of an organization or group.

Since iWordNets are a special case of iConceptNets, the steps to construct either are similar.

Initially, in one embodiment, the present invention begins with constructing an iConceptNet and gConceptnet. This involves picking a starting word (phrase, concept, picture, or object) and ask (face-to-face or online) and picking a subject to explain the word. Record the words. Instead of asking the subject to explain the word, we can ask the subject write down whatever come to his/her mind when he/she "sees" or "hears" the starting work, e.g., "smart." Next, a connection is made between the word to be explained and each word used in the explanation. Such a connection can be a directed segment (an arrow) or an undirected segment (a line). The connection between the paired words can also be recorded in a table form by entering the two words in two different columns of the same row. Words used in the explanation are further explained by other words and so there are more connection or edges. This process continues and ultimately an iConceptNet is constructed. This recursive process continues. In the process, some concepts or words used previously are expected to be used again, forming circular definitions. See example in FIG. 2.

The construction of gKnowledgenets or gWordNets is similar to that of iKnowledgeNets and iWordNets, but the former is accomplished through the collective effects of a group of people. The rules for building the network can be determined by the people in the organization/group.

TABLE 1

| iWordNet in Table format | |
| --- | --- |
| smart | intelligent |
| smart | knowledge |
| intelligent | wise |
| intelligent | knowledge |
| knowledge | smart |
| wise | knowledge |
| wise | experience |

Generating Topological Properties of an iConceptNet

Modeling cognitive, emotional, and personality measurements with word maps such as iConceptNets and gConceptNets with the following variables: Some or all of the topological properties; With or without the option for a choice of Starting Words; Single or multiple starting Words; One type or multiple types of iConceptNets and gConceptnets; Fixed or unfixed depth of iConceptNets or gConceptnets; Time Limit in constructing iConceptNet or gConceptnet; With or without pruning iConceptNets or iConceptNets; Directed or undirected networks; Weighted or unweighted networks. In a weighted network, there is a number representing a weight for the edge. For example, when a pair of concepts is repeated multiple times, we can put weights on the corresponding edge to reflect the replications. Another potential consideration includes inclusion of individual characteristics, such as gender, age, race, education, living area, socioeconomic information, etc.

There are different methods for creating an iConceptNet: we can use simple questions or computer games, ask the subjects to explain the meaning of a word or object, or use any other relationships. Concepts are expressed by any language, symbols, pictures, music clips, or any other objects. A child acquires a concept often before he/she understands a language or word. The iConceptNet can be in graphical forms or database forms. A network can be constructed once or piecewise to be connected later. Creating iKnowledgeNets from iConceptNets is flexible, pretty much defined by oneself. A gBrainMap can be created same way as for an iBrainMap, but by the effects of a group of people instead of one individual.

Common questions need to answer before construct an iConceptNet:
1. How should the starting word be chosen?
2. Should the depth of a question chain be fixed?
3. Should only the keywords be recorded when constructing an iConceptNet or should all the words be recorded? If only keywords are recorded, what would distinguish a keyword from a non-keyword?
4. If multiple iWordNets are created per person, how can they be used?
5. Should words be kept in their original form or should they be changed to a consistent form or default throughout the network? (e.g., verb tenses: "want" instead of "wants" or "wanted")?
6. Should words be redefined if repeated?
7. Should the subject give context-dependent definitions?
8. Should the subject use a limited number of key words in his/her definitions?

9. Should the subject be allowed to see what the interviewer is writing down?
10. How many rows of definitions (i.e. geodesic distance) should be used?

The local topological properties of an iConceptNet include vertices (nodes, words), degrees (number of links connecting a vertex to other vertices), cluster, betweenness centrality, closeness centrality, Eigenvalue centrality, PageRank, geodesic distance (shortest route between vertices), top items, etc. The global topological properties include, average number of vertices, average number of edges, number of components, number of cluster, clustering coefficient, mean geodesic distance, mean closeness centrality, mean closeness centrality, number of unique edges, graph density, and any derived variables from these variables.

As used herein, the following terms characterize the features of the iBrainMap or gBrainMap network generated as part of the present invention:

A vertex is a word, or a node where the word was removed. This may be an initial given word, or a word (or node after the words have been removed) that the user populates in through the generating process, as discussed above.

A link/edge is a direct connection between two vertices, in each link, the length is not important, and all links are considered to be the same length or a unit length.

Figure 6:
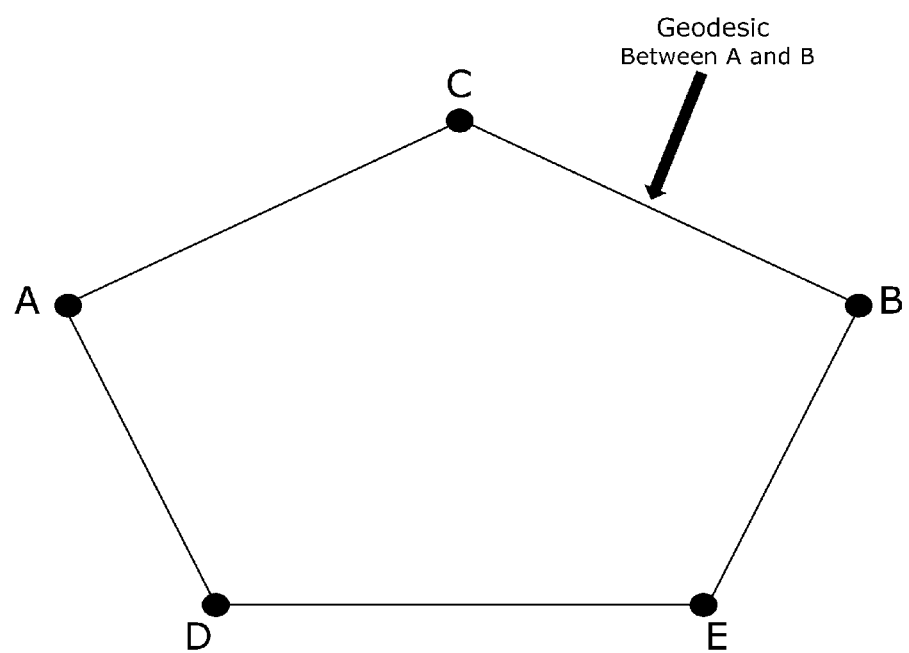
FIG. 6 provides an example of a geodesic along a word map.

A geodesic is the shortest path between two vertices on the network. In other words, it is the path that has the fewest links between the two vertices. An example of a Geodesic is shown in FIG. 6. In this figure, there are two paths from A to B; one has length 2 (A to C to B) and the other has length 3 (A to D to E to B). The geodesic (the path with shortest distance) between A to B is the path: A to C to B.

Figure 7:
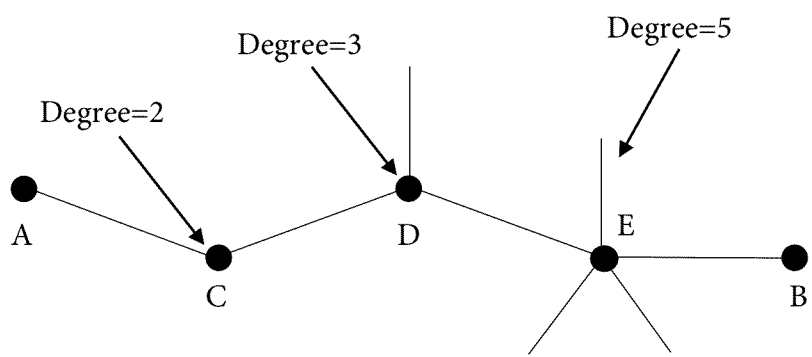
FIG. 7 provides an example of a node having a maximum degree along a word map.

Degrees relates to a vertex and is the number of direct links that the vertex has. An example of degrees along a geodesic is shown in FIG. 7.

Closeness centrality is the reciprocal of the sum of the geodesics between a vertex and all other vertices.

Graph density is a ratio that compares the number of edges in the graph with the maximum number of links the graph would have if all the vertices were connected to each other.

Topological properties of the word maps can provide a number of options for computerized language analysis. For example, the word maps may be used to analytically replace a word in a word string with another word. This replacement word may be advantageous in the word string for a number of reasons to optimize the language, enhance readability, comprehension, and the like.

In a particular embodiment, the above noted method of word replacement may be used in a computerized system to automatically review a sentence and optimize the language of the sentence by replacing certain words identified as little known or problematic with other related and more understandable or known words. This embodiment operates by using a word map (iBrainMap; gBrainMap, and the like), identifying a geodesic between a preceding and following word of the word at issue, and finding a node along the geodesic with the greatest number of degrees (commonness). The word corresponding to this common node may be used to replace the word at issue in the sentence. The computer can do this automatically, and can perform this process throughout an entire document.

Further, this process can be used to optimize the language of a document for a targeted group and can be utilized to make documents more readable for various groups of people and organizations, such as certain cultural groups, age groups, education groups, and the like. In a particular embodiment, the computer may flag a word in a string, sentence, document, and the like, as needing optimization if it is unknown in the word map, or is uncommon in the word map because it has a degree under a predetermined threshold. For example a word may be flagged if it has a degree that is in the bottom decile (though any range could be selected) of the word map, or has a degree that is less than a predetermined number, such as three (though any number may be selected). Put simply, the word at issue can be replaced with a word having the maximum degree (number of links) on the geodesic between the previous and following word to the word at issue. The meaning of the replaced word must be closely related to the two words (the preceding word and following word), and must be commonly used. The shortest distance (geodesic) between the preceding and following words reflects the closeness, and the word having the maximum number of links (degree) reflects the commonness.

If the word at issue to be replaced is the first word in a string/sentence or the like, it may be replaced with a word on the word map that directly connects to the second word in the string having the maximum degree among all of the words that directly connect to the second word. Similarly, if the word at issue is the last word in the word string, the word that directly connects on the word map to the second to last word that has the maximum degree among the words that directly connect to the second to last word is used for the replacement.

This embodiment may be used to solve the computerized problem of automatic computerized proofreading, particularly proofreading to optimize documents for certain groups of people or to individuals. For example, if a product information document is tailored to one group of people, such as middle aged urban residents, the present invention may be used to tailor the same document to young suburbanites based on group word maps of the young suburban group.

Figure 8:
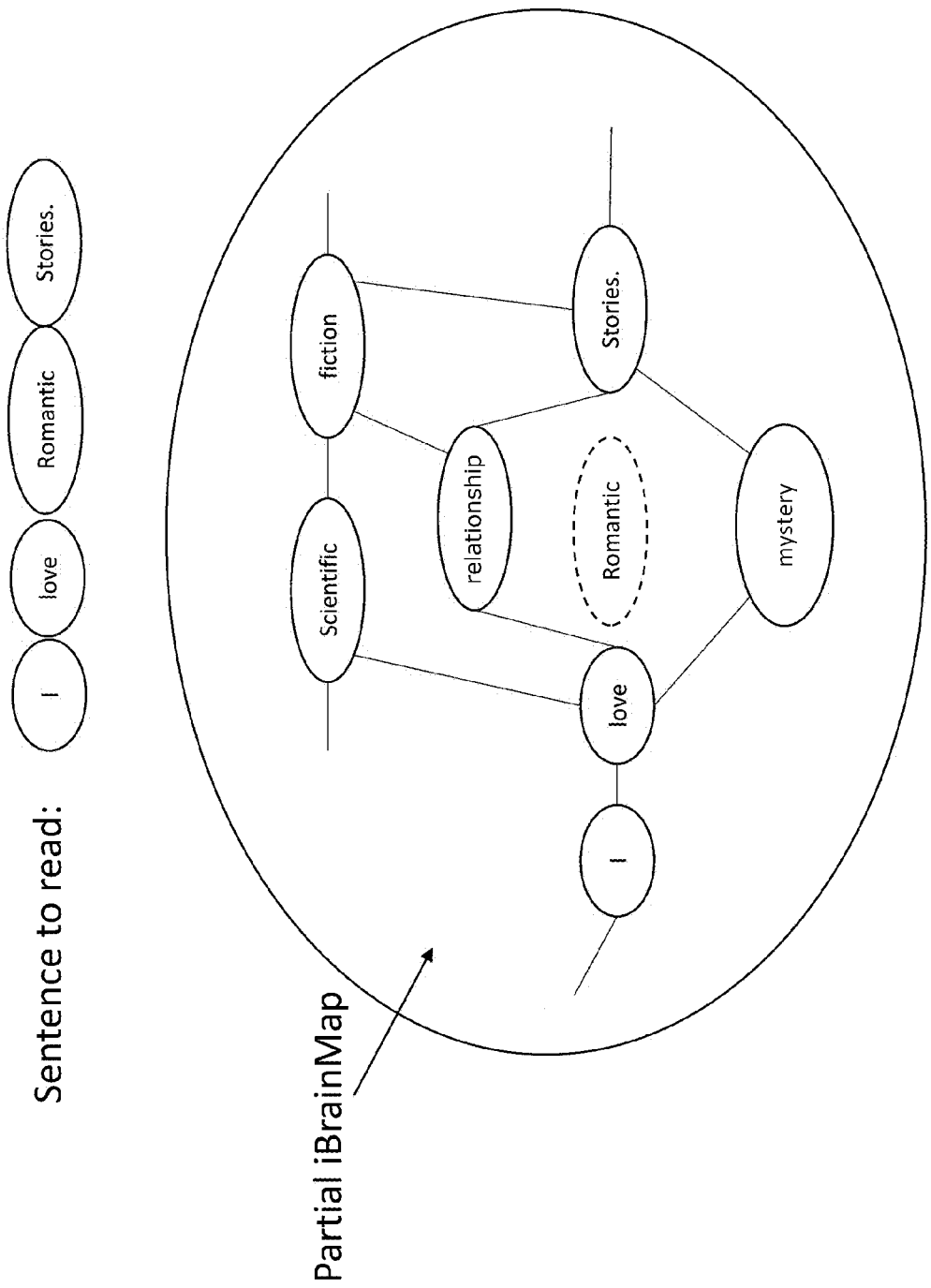
FIG. 8 provides a chart of an embodiment of a word replacement method contemplated herein.

An embodiment of the word replacement discussed can be seen in FIG. 8. Here, when a computer reads the sentence: "I love romantic stories" if the word romantic if flagged as non-optimal or unfamiliar based on the topological features of a word map, the computer may use the word map generated to substitute the word "relationship" which can roughly be a substitute for "romantic." The use of the word relationship may provide better understanding for those unfamiliar with the term "romantic" as identified by the iBrainMap or gBrainMap (or other word map). In the figure, there are two geodesics between love and stories (one node in between the two). Because "relationship" has more degrees (3) than does "mystery" (2), the replaced word will be selected as "relationship." While the replaced word need not directly link the two words, it may often be the case. When two words on the geodesics have the same degrees, other selections may be used, such as matching tense and grammar, or other topological factors of the word map, as discussed above.

Figure 9:
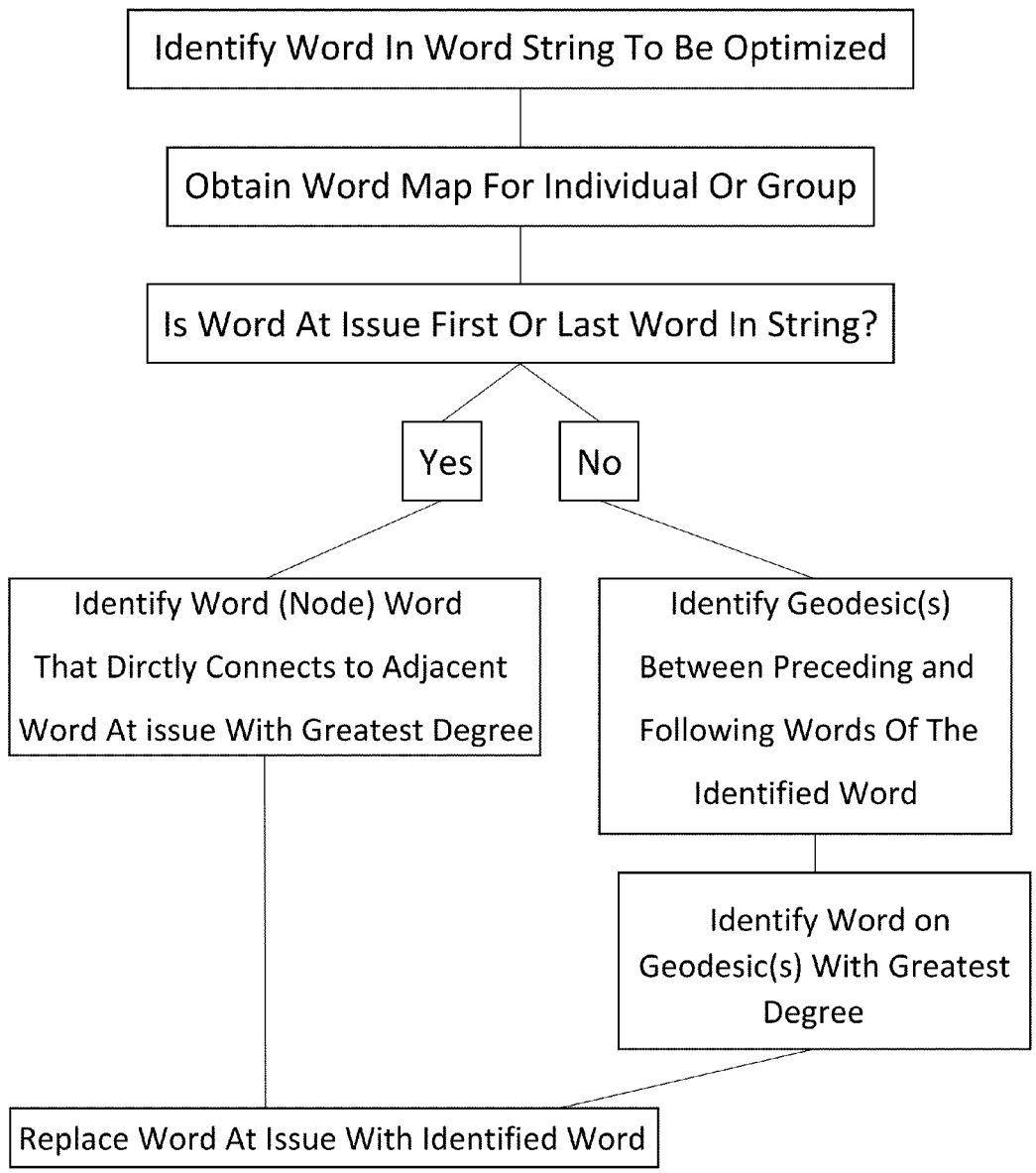
FIG. 9 provides a flow chart of an embodiment of a word replacement method contemplated herein.

A flow chart of an embodiment of this word replacement method can be seen in FIG. 9. Initially this flow chart begins with identifying a word in a word string to be optimized. A word map may be obtained for an individual or group based on who the string will be optimized for. A determination may be made if the word at issue is the first or last word in the string, or not. If yes, the word adjacent to the word at issue may be identified on the word map, and a word connecting by a link on the word map to this adjacent word that has the greatest degree on the word map can be selected. This selected word will then replace the word at issue. If the word at issue is not the first or last word in a string, then the geodesic(s) joining the word preceding and following the word at issue can be identified. On this geodesic or geodesics, the word having the greatest degree will be selected. This selected word will then replace the word at issue.

In addition to the analysis between iBrainMap and cognitive measures, we have also developed the following new methods to numerically characterize a person's or group's understanding of a language: (1) a person's understanding of a string of words (a phrase, sentence or article) is determined by the path in the iBrainMap marked by the sequence of the words in the word string. (2) the sequence of topological properties (such as the degrees, centralities, and geodesic distances) of the nodes along the path forms a sequence of vectors or numerization string. This numerization string represents an individual's understanding of the word string. Let's use the sentence "We can use a network approach to study a mind" to illustrate the method: Suppose from a person's iBrainMap, the words, "we," "can," "use," "a," "network," "approach," "to," "study," "a," and "mind" have degrees 5, 4, 7, 3, 2, 9, 12, 6, 3, and 8, respectively, then the numerization string {5, 4, 7, 3, 2, 9, 12, 6, 3, 8} is a numerical representation of the person's understanding of the sentence. Of course, difference people have a different understanding of the sentence, so their iBrainMaps are different, and therefore, their numerization strings are different.

If we want to characterize a person's understanding of word string more precisely, we can use more than one of the iBrainMap's local properties, for example, degrees and closeness of vertices on the path of the word string. Using the same example as before, "We can use a network approach to study a mind." Suppose from a person's iBrainMap, in addition to the degrees, the words, "we," "can," "use," "a," "network," "approach," "to," "study," "a," and "mind" have closeness: 0.001, 0.003, 0.0012, 0.0023, 0.0015, 0.0032, 0.004, 0.0012, 0.003, and 0.0026, respectively. The numerization string becomes: {(5, 0.001), (4, 0.003), (7, 0.0012), (3, 0.0023), (2, 0.0015), (9, 0.0032), (12, 0.004), (6, 0.0012), (3, 0.003), (8, 0.0026)}. Similarly, we can construct numerization strings with three or more different properties of iBrainMap.

This numerization string can also be visualized or converted to sound or music. For example, the visualization of a numerization string with a single property can be done with a bar chart or line graph. A numerization string with two properties can be done with two instruments, each playing a sequence of numbers that presents a different property. For a numerization string with three different properties, each set of the three numbers can be represented by the red color value, green color value, and yellow color value for example, thus the a numerization of be represented by a color line. In general a numerization string with multiple properties can be converted into a "symphony." Of course, before converting the numbers to color or sound, they must be rescaled using linear transformation, so that the numbers represent the frequencies in the human's visible or auditable ranges. This numerization string can be a powerful tool for the statistical analysis of a person's understanding of a language.

Significance of the Invention and Potential Applications

In a way, we can view Neuroscience as a biological study of the brain and mind, and Cognitive Science as a psychological approach to studying the mind and how we acquire knowledge. The present invention, however, provides a new way, using network technology to study the brain/mind and cognitive science. iConceptMapping is a non-invasive, low-cost, and environmentally friendly tool for studying cognitive science and psychology. A study of cognitive science using iConceptMapping can be done quickly, with almost no environmental constraints, and can be done anywhere, in any Language, in any combination of languages, with no limitations on age or language ability. The changes in the outcomes can be easily monitored over time, and the difference can be compared across individuals.

Just like a neurologist can obtain images of a patient's brain and determine where the damage is, we can see what defects in the iConceptNet might impair a person's math ability for example by comparing his/her iConceptNet to other people's iConceptNets who have high math skills and proceed to directly target his/her iConceptNet or individualize teaching/learning methods to improve education systems as a whole.

Network Science has been emerging because our lives are intimately tied to different types of networks, whether it is social networks, transportation networks, or neural networks. To use Network Science methodology to study the mind and cognitive development, knowledge needs to be expressed as a network of concepts as we did in the present invention using iBrainMaps and gBrainMaps. iBrainMaps and gBrainMaps are about to reflect one's state of mind and state of knowledge.

In the present invention, the meaning of a word is defined by its location in relation to other words or events, not its appearance. If the word "foot" wherever and whenever it appears were replaced with word "hand", the meanings of "foot" and "hand" would be switched. The meaning of a word is defined by the way it has been used, or its locations, not the way it has been written. That is why different languages in the world almost equally word well in their own environments. The connections of words or concepts in iBrainMaps primarily represent a body of individual knowledge. As a result, knowledge is expected to reside in the network or more precisely in the topology of the iBrainMaps. Therefore, it makes perfect sense to study Cognitive Science and other related sciences such as Artificial Intelligence through a Network Science.

Potential Applications of the Invention

In various embodiments, the present invention may be used for a number of applications including, but not limited to: Evaluating one's knowledge over time using iBrainMaps; Evaluating one's personality over time using iBrainMaps; Evaluating one's emotions over time using iBrainMaps; Analyzing and evaluating the cognitive impairment in patients or the elderly using iBrainMaps; Studying why people have different skills using iBrainMaps and gBrainMaps; Comparing the knowledge of different individuals using iBrainMaps for improving of teaching and learning methods or education systems; Studying the collective intelligence of a group over time using gBrainMaps and providing insights for company performances or university curriculums; Using the topologies of iBrainMaps and gBrainMaps together with other variables such as race, gender and age to study the differences among different ethnic, gender, and age groups; Studying people with communication deficiencies using iConceptMapping; Using iConceptMapping independently or with neurological technical and psychological approaches in research or in clinics; Using iBrainMaps can personalize the understanding of word string, and numerization string can be used in computational linguistics at individual level. This is evolutional because the prior art only analyzes the meaning of a word string as far as "common understanding", which does not reflect the differences between different people's understandings for the same word string.

In one embodiment, the present invention allows comparison of two students' iBrainMaps in order to identify the reasons why one is good at math and the other is good at art, thereby changing teaching-learning methods to directly target or "repair" the iBrainMap to make both students good at both subjects. The present invention can also be used to explain one's memory loss in a particular aspect by look into his iBrainMaps over time, and determining how to deal with it. The gBrainMap is simply an extension of iBrainMap by considering a person as an organization.

To further elaborate on the outputs of the iBrainMap analyses, an example is provided: to evaluate the effectiveness of a teaching-learning method or curriculum, a statistical computer software may be used to carry out the analysis to find a model or equation similar to the one above. Alternatively or in addition, one can identify each significant network property that contributes to the diseases or cognitive measures. Such statistical models will allow the present invention to identify the reasons that cause a problem, suggest a remedy, and make outcome predictions. At the individual level, the iBrainMap may suggest a particular "treatment" for a person/patient.

In a particular embodiment, a pilot study was conducted. We can use this real life example to illustrate how to use iConceptMapping and enlighten the bright future of iConceptMapping.

As part of the project, we were interested in how one's IQ is related to his/her iWordNet. To pursue the answers, we obtained IQ Scores and iWordNets from 20 subjects.

The IQ test employed was designed to measure short-term memory, analytical thinking, abstract problem solving, mathematical ability and spatial recognition. Like all IQ tests, it doesn't intend to measure the amount of knowledge the individual has, but rather the capacity of the individual to learn. For the iWordNets, each individual was first told to define the word "smart." We chose to use the word "smart" because we wanted to compare iWordNets and IQ, so we conjectured that if the starting word is related to IQ, it would help us to establish a relationship between them. After defining the first word, the subject was told to define the key words in its definition, and further the definitions of the definitions. The key words were chosen based on their importance in an individual's definition. For example, if a person defined "smart" as "the state of being intellectual or having knowledge," we would record down the words "state," "intellectual," "have," and "knowledge." The words and the key words in their definitions are considered to be the vertices of the network and are linked together with lines (edges), forming a network of words, i.e., iWordNet.

By analyzing the iWordNet for each individual, we obtained the topological properties, such as degree, geodesic distance, and modularity, of the networks. Then, we modeled the relationships between network properties and IQ results using linear regression in statistics.

Materials:

Computer (with internet access); IQ test; Network software; Statistical Analysis Software; Human subjects (at least 20).

Procedure:

Before Experiment: Recruit subjects; Obtain their consent forms.

Data Collection: Give the subject the IQ test to take online. This will take about 10-15 minutes. Save an electronic copy of the subject's IQ scores. In a data collection document, record the subject number, his/her IQ score.

For the word nets, give the subject the word "smart" to start with and tell them to define it. Tell the subject to further define the key words in their definition as the second step.

As they speak, record the key words in their definitions. Later, words to define and the defining words are pairwise entered in a computerized system. After inputting the words for each subject into the computer, one will eventually be able to create a word iWordNet for that individual. In a particular embodiment the computerized system may be able to automatically receive voice inputs through a microphone, and may use speech recognition to automatically input the words received, to automatically generate the iWordNet.

Continue with this process until they have reached a distance of 10 links from the starting word, "smart" (limit each iWordNet to 10 links from the starting word to the farthest word). Repeat steps 2-8 for all 20 subjects. Compiling data and data analysis: Once steps 2-8 have been accomplished for all 20 subjects, use the tools on a computerized system to analyze the network and generate the topological properties of each iWordNet (centrality, vertices, geodesic distance, etc.).

On the master spreadsheet, compile all the data, with the subject number, IQ score, and values for the key topological properties of the iWordNets automatically by the computer.

To analyze the data, use computerized statistical analysis software to explore the relationships between various network properties and IQ.

Results

Figure 4:
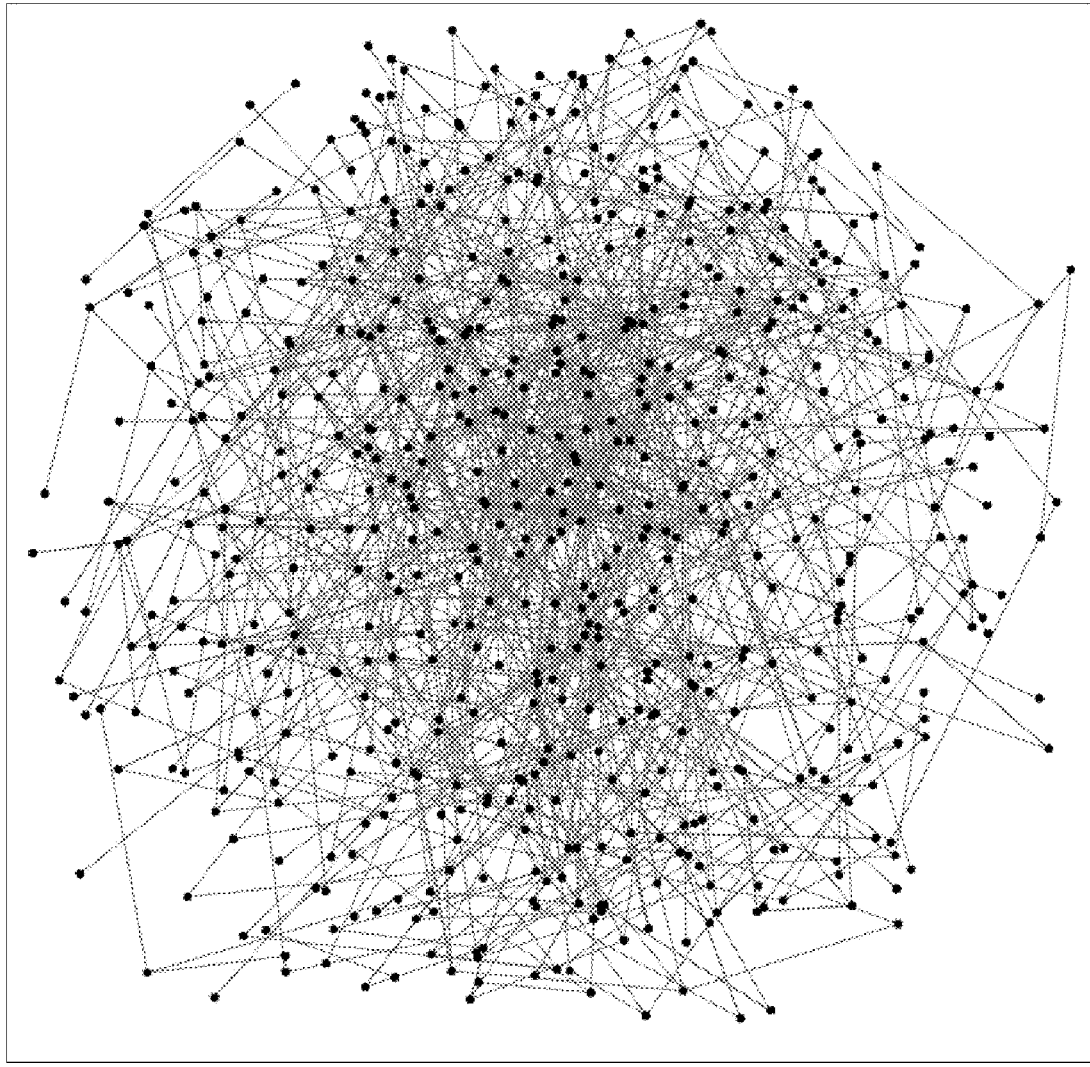
FIG. 4 provides a view of yet still another embodiment of a word map.

In the analysis, and as shown in FIG. 4, all the words in the iBrainMap were replaced with dots in the analysis since the meaning of words are irrelevant. In other words, to predict one's IO using iConceptMapping, we don't need to know what vocabularies the person has.

Figure 5:
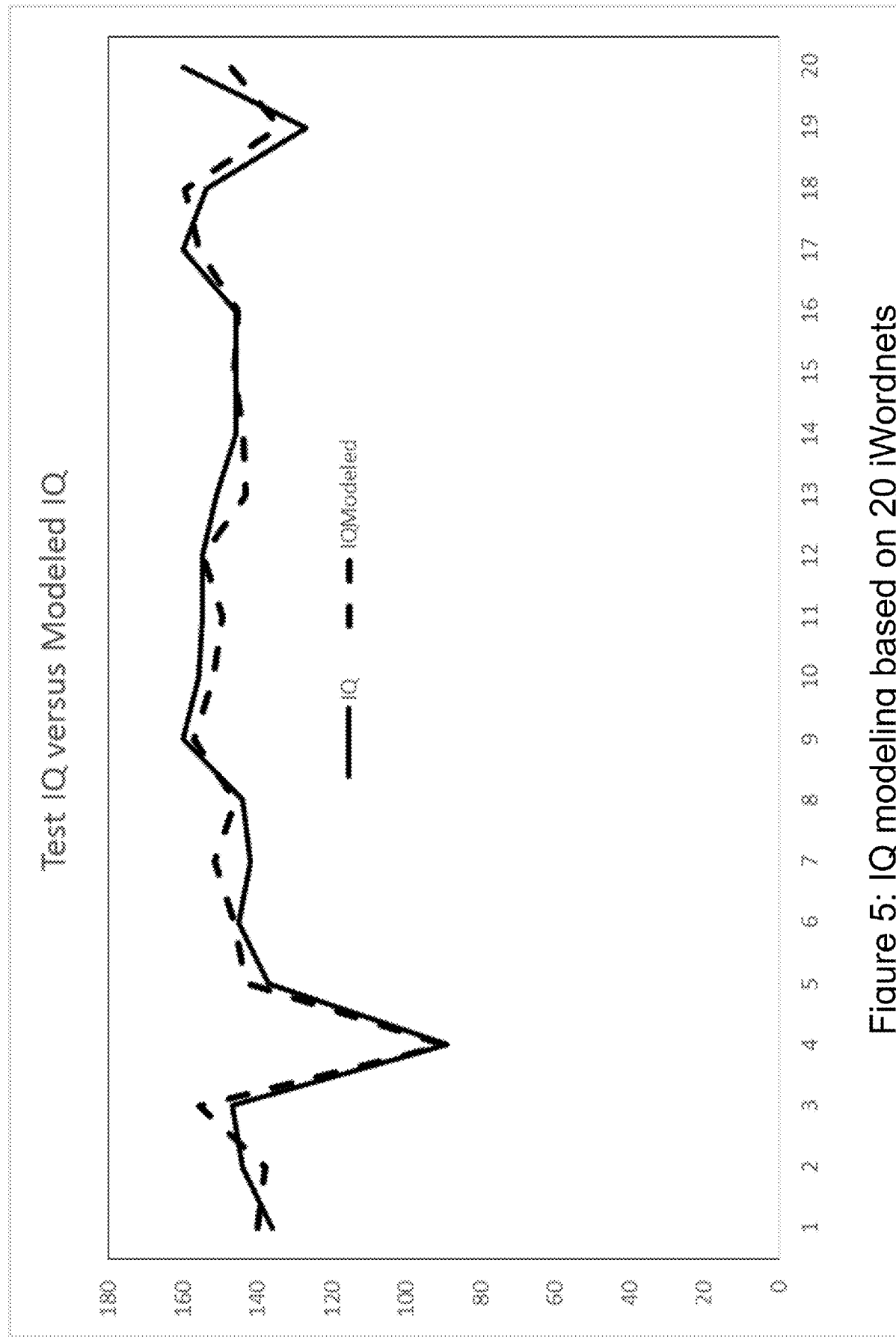
FIG. 5 provides a chart modeling IQ based on word maps.

Initially 9 geometrical variables of iBrainMaps were included. We used linear regression with backward-elimination methods with the staying p-value less than 0.1. The final model had 7 variables with a model p-value of 0.02 and an R-squared value of 74%. See Table 2. The p-values (without multiplicity adjustment) associated with the model and variables in the model are presented in Table 2 and FIG. 5.

TABLE 2

IQ Modeling Results

|  | P-Value (without multiplicity adjustment) |
|---|---|
| Model | 0.0002 |
| Mean Degree | 0.0199 |
| Modularity | 0.0137 |
| Total Number of Edges | 0.0295 |
| Unique Edges | 0.0093 |
| Graph Density | 0.0798 |
| Density Over Vertices | 0.0612 |
| Betweenness Centrality Over Total Edges | 0.0589 |

From this pilot study, the results are very encouraging: a statistically significant relationship exists between IQ and iWordNets. IQ is one's potential, while knowledge reflects one's current state of mind. Therefore, the relationship between knowledge and iWordNets should be even stronger.

In summary, the present invention, iConceptMapping, is a methodology to study a person's cognitive development through the networks of concepts. The system consists of three main parts: (1) constructing individual networks of concepts (2) Numerization of a person's understanding of word strings (phrases, sentences, articles), and (3) modeling cognitive ability using the networks. One explains a concept by other concepts, which are further explained by other concepts, and so on. By connecting a concept to be explained with the concepts directly used in the explanation, a network of concept is constructed. The network reflects the state of mind of a person, so it can be used to study an individual's knowledge, learning ability, etc. The local topological properties can be used to evaluate the elderly or patients' cognitive impairment or in education and research to explain why some people are good at certain things and others are good at other things. The local properties, global properties, and one's baseline characteristics, including genetic, genomic information, and demographics can be used to model cognitive development, the effectiveness of a teaching method, the effect of clinical interventions, etc.

As discussed above, in one embodiment, steps of the present invention include: constructing networks of concepts, which include iConceptNets and gConceptnets. An iConceptNet is a network of concepts from an individual, which reflects the state of mind of the individual. A gConceptnet is a network of concepts from a group of people, which reflects the collective intelligence of the group or the organization. Generating topological properties of iConceptNets and gConceptnets. Numerization of a person's understanding of word strings (phrases, sentences, articles). And/or analyzing and modeling the cognitive attributes and emotional attributes with topological properties of iConceptNets and gConceptnets.

The constructing may comprise: asking each subject to explain an initial concept, the concept can be represented by words, phrases, pictures, or other objects in a single or multiple languages; making a link between the initial concept and the concepts used to explain the concept; the concepts are explained further by other concepts and more links between pairs of concepts are created. The process continues until stopping criteria are met. In making a connection between paired concepts, the relationship does not have to be "one explains the other." It can be "one make you think the other", e.g., "fire" make you think "water", "cigarettes" make you think "cancer." The relationship can also be one is similar to other, one is a cause or consequence of the other. For example, the relationship between disease and death is a causal relationship. We can place the same vertices from different iConceptnets together to form an iKnowledgenet. That is, vertices with the same or similar items are considered the same vertices in constructing iKnowledgeNets. Further, we can place the same vertices from different gConceptnets together to form a gKnowledgenet. That is, vertices with same or similar items are considered same vertices in constructing gKnowledgenets. Moreover, such networks can be joined together to form even larger networks.

It is important to know that there are two distinct features of iConceptMapping, which are different from neural network modeling in cognitive neuropsychology: (1) an iBrainMap is used in iConceptMapping, instead of a real neural network as used in cognitive neuropsychology. (2) The topological properties in modeling cognitive abilities are used in iConceptMapping, while cognitive neuropsychology uses the physical location of neural networks. In other words, in a neural network, the concept of physical distance is important, while in iConceptMapping there is no physical distance at all.

iConceptMapping is also completely different from Artificial Neural Network (ANN). Multiple-layer ANN is a fast-developing topic in artificial intelligence, often by the acronym Deep Learning. ANN is an unsupervised learning method, which uses piecewise functions to model human learning mechanisms. In an ANN, model parameters are determined by training data sets and the backward propagation algorithm. ANN can be visually represented by a network with several layers. The total number of nodes (vertices) is subjectively determined and is usually much less than 100. A value is assigned to each node as a threshold to trigger the node to fire.

iConceptMapping is not a personal survey to investigate individual attitudes toward certain social issues or products. iConceptMapping is a way of constructing a brain map or man-made neural network (different from ANN). An example of iBrainMaps using iConceptMapping is shown in FIG. 4 with no words in the vertices.

iConceptMapping is not a documentation retrieval system or search engine because there is no documentation or a large collection of information for user to retrieve and statistical methods to summarize and retrieve such information are not a concern at all.

Most importantly, the invention is based on the belief that the meanings of words are nothing but word-mapping games. For this reason, the iBrainMaps remain the same functions after the words are removed and replaced with any other symbols or dots (FIG. 4). The distinction of iConceptMapping from all other methods and technologies in Computational Linguistics, Cognitive Science, and the like, is that iConceptMapping does not rely on the connotations of words (i.e. the conventional wisdom); the meaning of a word can simply be interpreted as mathematical mapping. As a result, the analysis can be purely based on the topological properties of iConceptNet. In other words, all the words or symbols in the iBrainMap can be replaced with identical dots without affecting the analysis and interpretation of the results. On the other hand, ConceptNet®, WordNet®, and the like, are empty or useless if the words were replaced with dots because the meanings or the connotations of the words are essential in those networks. In fact, the analysis performed with iConceptMapping is a network without words. iBrainMap is not a network of synonyms, but a mathematical network that reflects the knowledge of an individual. Words are only needed in the process of constructing iBrainMaps, but in the final iBrainMap for the analysis, words may not be necessary in many embodiments; just the skeleton of the iBrainMap is needed. This fundamental difference between iConceptMapping and other network methods/technologies in cognitive science and artificial intelligence makes iConceptMapping very unique.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

What is claimed is:
1. A computerized method for forming a word map comprising the steps of:
identifying a subject to form the word map for;
providing, by a computer, the subject with a base word;

recording, using the computer, a plurality of related words that the subject provides based on the base word;
recording, using the computer, a second plurality of words provided by the subject related to each of the plurality of related words;
providing, by the computer, the subject with a second base word;
recording, using the computer, a third plurality of related words that the subject provides based on the base word;
recording, using the computer, a fourth plurality of words provided by the subject related to each of the plurality of related words;
plotting, by the computer, each of the recorded plurality, second plurality, third plurality, and fourth plurality of words, and connecting, using a visual link, a connection of all of the recorded words as recorded, such that a first word links to the word to which it relates, and has links to other related words as provided by the subject;
identifying, using the computer, a word of a sentence in a document to be optimized, the word having a preceding word and a following word, the optimizing comprising replacing the identified word with a replacement word; the step of optimizing comprising:
identifying, by the computer on the plot formed by the computer, a shortest path along the plurality of links between the preceding word, and the following word;
identifying, by the computer, a word along the identified shortest path having a greatest number of links connecting to and from it on the plot formed by the computer;
selecting, by the computer, the identified word along the identified shortest path having the greatest number of links connecting to and from it as the replacement word;
replacing the identified word with the selected replacement word automatically in the document by the computer;
identifying, using the computer, a word of a second sentence in the document to be optimized, wherein the word is a first word in the second sentence or a last word in the second sentence, the word having one of a preceding word and a following word, the optimizing comprising replacing the word with a second replacement word; the step of optimizing comprising:
identifying, by the computer, a plurality of words of the plot that connect by one link to the preceding if the identified word is the last word in the sentence, or the following word if the identified word is the first word in the sentence;
selecting a second replacement word, automatically by the computer by the computer selecting one of the plurality of words identified having a greatest number of links connecting to it; and
replacing the identified word with the selected second replacement word automatically in the document by the computer.

2. The method of claim 1 further comprising the steps of:
identifying a second subject to form the word map for;
providing, by the computer, the second subject with the base word;
recording, using the computer, a plurality of related words that the second subject provides based on the base word;
recording, using the computer, a second plurality of words provided by the second subject related to each of the plurality of related words;
providing, by the computer, the second subject with the second base word;
recording, using the computer, a third plurality of related words that the second subject provides based on the base word;
recording, using the computer, a fourth plurality of words provided by the second subject related to each of the plurality of related words;
plotting, by the computer, on the same plot as for the subject, each of the recorded plurality, second plurality, third plurality, and fourth plurality of words, and connecting, using a visual link, a connection of all of the recorded words as recorded, such that a first word links to the word to which it relates, and has links to other related words as provided by the subject.

3. The method of claim 2 wherein the second subject is a group of individuals.

4. The method of claim 1 wherein the computer is configured to identify each word from the subject using a speech recognition, and is configured to automatically map and link the words received.

5. The method of claim 1 wherein the computer is configured to automatically identify at least one of a plurality of shapes to which the plot generated relates.

6. The method of claim 1 further comprising the steps of:
obtaining a word string comprising a plurality of words in order by the computer;
identifying on the generated word map each word of the word string, by the computer;
identifying a degree of each identified word on the word map; and
constructing a numerization string based on the identified degree, the numerization string being a listing of the identified degree of each word of the word string in the same order as the word string.

7. The method of claim 1 wherein each of the links is a directional link, having a direction from the base word to one of the plurality of words.

8. The method of claim 1 further comprising the step of removing words plotted from the plot, automatically by the computer, and leaving only a node and links to connected nodes.

9. The method of claim 1 further comprising the step of using the computer to identify each of a plurality of shortest distances between each word linked on the plot.

10. The method of claim 9 further comprising the step of using the computer to identify a number of links to and from each word plotted.

11. The method of claim 10 further comprising the step of generating, using the computer, a numerical string that corresponds to the base word and the second base word, the numerical string comprising the identified number of links to and from the base word, and the second base word.

12. The method of claim 11 wherein the numerical string further comprising a reciprocal of the sum of the identified shortest distances between the base word and all other identified words, and a reciprocal of the sum of the identified shortest distances between the second base word and all other identified words.

13. A method for replacing a word in a sentence automatically using a computer comprising the steps of:
identifying a subject to form the word map for;
providing, by a computer, the subject with a base word;
recording, using the computer, a plurality of related words that the subject provides based on the base word;

recording, using the computer, a second plurality of words provided by the subject related to each of the plurality of related words;

providing, by the computer, the subject with a second base word;

recording, using the computer, a third plurality of related words that the subject provides based on the base word;

recording, using the computer, a fourth plurality of words provided by the subject related to each of the plurality of related words;

plotting, by the computer, each of the recorded plurality, second plurality, third plurality, and fourth plurality of words, and connecting, using a link, a connection of all of the recorded words as recorded, such that a first word links to the word to which it relates, and also links to other words through the word to which it relates, and has links to other related words as provided by the subject;

identifying, using the computer, a word of a sentence in a document to be optimized, the word having a preceding word and a following word, the optimizing comprising replacing the identified word with a replacement word; the step of optimizing comprising:

identifying, by the computer on the plot formed by the computer, a shortest path along the plurality of links between the preceding word, and the following word;

identifying, by the computer, a word along the identified shortest path having a greatest number of links connecting to and from it on the plot formed by the computer;

selecting, by the computer, the identified word along the identified shortest path having the greatest number of links connecting to and from it as the replacement word;

replacing the identified word with the selected replacement word automatically in the document by the computer.

14. The method of claim 13 wherein the subject is a group of individuals, wherein each of the base word and second base word are read to each individual, wherein the plurality of words, second, third and fourth plurality of words are all recorded from the group of individuals.

15. The method of claim 13 wherein the step of identifying the word to be optimized comprises the steps of:

identifying each word of the sentence, using the computer on the word plot formed by the computer;

wherein if any of the words of the sentence has a number of links to and from it that are below a predetermined number, the word is selected for optimization, and wherein if any of the words of the sentence has the number of links to and from it that are above the predetermined number, the word is not selected for optimization.

16. The method of claim 15 further comprising the step of performing the identifying, selecting, and replacing step for each sentence of the document.

17. The method of claim 13 wherein the step of replacing the identified word is performed for all instances of the word in the document.

18. A method for replacing a word in a sentence automatically using a computer comprising the steps of:

identifying a subject to form the word map for;

providing, by a computer, the subject with a base word;

recording, using the computer, a plurality of related words that the subject provides based on the base word;

recording, using the computer, a second plurality of words provided by the subject related to each of the plurality of related words;

providing, by the computer, the subject with a second base word;

recording, using the computer, a third plurality of related words that the subject provides based on the base word;

recording, using the computer, a fourth plurality of words provided by the subject related to each of the plurality of related words;

plotting, by the computer, each of the recorded plurality, second plurality, third plurality, and fourth plurality of words, and connecting, using a link, a connection of all of the recorded words as recorded, such that a first word links to the word to which it relates, and also links to other words through the word to which it relates, and has links to other related words as provided by the subject;

identifying, using the computer, a word of a sentence in a document to be optimized, wherein the word is a first word in a sentence or a last word in a sentence, the word having one of a preceding word and a following word, the optimizing comprising replacing the word with a replacement word; the step of optimizing comprising:

identifying, by the computer, a plurality of words of the plot that connect by one link to the preceding if the identified word is the last word in the sentence, or the following word if the identified word is the first word in the sentence;

selecting a replacement word, automatically by the computer by the computer selecting one of the plurality of words identified having a greatest number of links connecting to it; and replacing the identified word with the selected replacement word automatically in the document by the computer.

19. The method of claim 18 further comprising the step of performing the identifying, selecting, and replacing step for each sentence of the document.

20. The method of claim 18 wherein the subject is a group of individuals, wherein each of the base word and second base word are read to each individual, wherein the plurality of words, second, third and fourth plurality of words are all recorded from the group of individuals, and wherein the process of optimizing comprises optimizing the document for readability by the group of individuals.

* * * * *